(12) United States Patent
Eckols et al.

(10) Patent No.: US 11,549,629 B2
(45) Date of Patent: Jan. 10, 2023

(54) ENHANCED FLUID DEFLECTION ANGLE STRUCTURES AND METHODS FOR MANUFACTURING

(71) Applicant: The Boeing Company, Chicago, IL (US)

(72) Inventors: David A. Eckols, Edmonds, WA (US); Mitchell L. R. Mellor, Bothell, WA (US)

(73) Assignee: The Boeing Company, Chicago, IL (US)

( * ) Notice: Subject to any disclaimer, the term of this patent is extended or adjusted under 35 U.S.C. 154(b) by 399 days.

(21) Appl. No.: 16/732,983

(22) Filed: Jan. 2, 2020

(65) Prior Publication Data
US 2021/0207752 A1    Jul. 8, 2021

(51) Int. Cl.
| | | |
|---|---|---|
| *B23K 101/06* | (2006.01) | |
| *B23K 26/342* | (2014.01) | |
| *B33Y 10/00* | (2015.01) | |
| *B33Y 50/02* | (2015.01) | |
| *B33Y 80/00* | (2015.01) | |
| *F16L 43/00* | (2006.01) | |
| *F16L 9/19* | (2006.01) | |

(52) U.S. Cl.
CPC .......... *F16L 43/001* (2013.01); *B23K 26/342* (2015.10); *B33Y 80/00* (2014.12); *F16L 9/19* (2013.01); *B23K 2101/06* (2018.08); *B33Y 10/00* (2014.12); *B33Y 50/02* (2014.12)

(58) Field of Classification Search
CPC ....... F16L 9/19; F16L 9/18; F16L 9/20; F16L 43/001; F16L 43/00
See application file for complete search history.

(56) References Cited

U.S. PATENT DOCUMENTS

| | | | | |
|---|---|---|---|---|
| 3,343,250 | A * | 9/1967 | Goforth | F16L 9/18 138/112 |
| 9,939,087 | B2 * | 4/2018 | Kolarski | F16L 9/125 |
| 11,143,349 | B2 * | 10/2021 | Rappitsch | B64D 37/005 |
| 2013/0312865 | A1 * | 11/2013 | Baur | F16L 9/18 219/121.64 |
| 2015/0285502 | A1 * | 10/2015 | DiCintio | B23K 15/0086 60/737 |
| 2016/0208708 | A1 * | 7/2016 | Butcher | B22F 5/10 |
| 2017/0219134 | A1 * | 8/2017 | Kedor | B22F 10/40 |
| 2017/0336007 | A1 * | 11/2017 | Rappitsch | B64D 37/005 |
| 2019/0120414 | A1 * | 4/2019 | Palmer | B33Y 80/00 |
| 2021/0207752 | A1 * | 7/2021 | Eckols | B23K 26/342 |

FOREIGN PATENT DOCUMENTS

| | | | | |
|---|---|---|---|---|
| DE | 102014104334 A1 * | 10/2015 | ......... | B29C 67/0077 |
| EP | 3473910 A1 * | 4/2019 | ............ | B33Y 80/00 |
| GB | 2440546 A * | 2/2008 | ............ | B22F 3/1055 |
| WO | WO-2009148680 A2 * | 12/2009 | ............ | B23P 6/005 |
| WO | WO-2015089033 A1 * | 6/2015 | ............ | B23P 15/26 |

* cited by examiner

*Primary Examiner* — Jacob J Cigna

(74) *Attorney, Agent, or Firm* — Parsons Behle & Latimer (57) ABSTRACT

A 3D-printed aluminum fuel fitting solution demonstrates higher performance at a potentially lower cost and shorter lead time. The resulting geometry also produced 30% weight savings leaving all interfaces intact.

20 Claims, 7 Drawing Sheets

ENHANCED FLUID DEFLECTION ANGLE STRUCTURES AND METHODS FOR MANUFACTURING

FIELD OF THE DISCLOSURE

This disclosure relates generally to redundant wall fluid deflection systems and methods for manufacturing the same. In particular, this disclosure relates to systems and methods for additively manufacturing redundant wall fluid fittings.

BACKGROUND

Existing systems and methods of manufacture for fluid elbow fittings typically require an aluminum, titanium, stainless steel, or the like structure with many casting complexities, extensive machining steps, and long lead times. Additionally, for some geometries castings are too complex for a metal part. For example, current fittings have as many as 70 intersecting and complex drilling passages, include excess material waste, and have a less than ideal 90° deflection angle. These and other drawbacks and inconveniences can increase part costs, require long lead times and result in a heavier part. Other drawbacks, inconveniences, and issues also exist.

SUMMARY

Accordingly, disclosed embodiments address these and other drawbacks and inconveniences of existing systems and methods.

Disclosed embodiments include a redundant wall fluid deflection fitting having a first flange that includes an outer wall, an inner wall, and a first drain tube interface between the inner wall and the outer wall with one or more drain tubes. Embodiments of the fitting also include a first bend between the first flange and a substantially straight portion and including the outer wall, the inner wall, and the one or more drain tubes. Embodiments of the fitting also include a second bend between the substantially straight portion and a second flange that includes the outer wall, the inner wall, and a second drain tube interface between the inner wall and the outer wall with the one or more drain tubes and wherein the first flange and the second flange are oriented at an angle substantially defined by the radii of curvature of the first bend and the second bend, and wherein the one or more drain tubes comprise substantially continuous curved tubes.

Further disclosed embodiments of the redundant wall fluid deflection fitting include one or more reinforcement gussets extending between an outer surface of the first flange and the outer wall.

Further disclosed embodiments include one or more attachment lugs near the first flange. Still further disclosed embodiments include one or more reinforcement structures on the attachment lugs.

Further disclosed embodiments include a drain in the outer wall and in fluid communication with the one or more drain tubes.

Further disclosed embodiments of the redundant wall fluid deflection fitting include one or more reinforcement gussets extending between an outer surface of the first flange and the outer wall, and one or more reinforcement gussets extending between an outer surface of the second flange and the outer wall.

In further disclosed embodiments, the outer wall has a substantially circular cross-section, the inner wall has a substantially circular cross-section smaller than the outer wall cross-section, and the drain tube interface has a substantially circular cross-section between the inner wall cross-section and the outer wall cross-section, and the drain tube interface comprises a plurality of drain tubes. In further disclosed embodiments, the plurality of drain tubes substantially surround the inner wall. In still further disclosed embodiments, the plurality of drain tubes are substantially continuous tubes. In still further embodiments, the plurality of drain tubes are substantially continuous curved tubes.

Also disclosed are methods for manufacturing a redundant wall fluid deflection fitting, including loading a build file into a Selective Laser Melting (SLM) additive manufacturing machine, the build file including instructions to cause a hardware processor in the SLM additive manufacturing machine to print the redundant wall fluid deflection fitting on a build plate in accordance with the build file instructions by additively printing a first flange including an outer wall, an inner wall, and a drain tube interface between the inner wall and the outer wall having one or more drain tubes. Disclosed methods also include additively printing the outer wall, the inner wall, and the one or more drain tubes continuously through a first bend to a substantially straight portion to a second bend, additively printing a second flange including the outer wall, the inner wall, and the drain tube interface between the inner wall and the outer wall and including the one or more drain tubes and wherein the first flange and the second flange are oriented at an angle substantially defined by the radii of curvature of the first bend and the second bend, and wherein the one or more drain tubes comprise substantially continuous curved tubes, and removing the redundant wall fluid deflection fitting from the build plate.

Further disclosed methods include additively printing one or more reinforcement gussets extending between an outer surface of the first flange and the outer wall.

Further disclosed methods include additively printing one or more attachment lugs near the first flange. Still further disclosed methods include additively printing one or more reinforcement structures on the attachment lugs.

Further disclosed methods include additively printing a drain in the outer wall and in fluid communication with the one or more drain tubes.

Further disclosed methods include instructions to cause the hardware processor in the SLM additive manufacturing machine to additively print the redundant wall fluid deflection fitting in a substantially vertical orientation from the first flange to the second flange.

Further disclosed methods include instructions to cause the hardware processor in the SLM additive manufacturing machine to additively print the outer wall in a substantially circular cross-section, the inner wall in a substantially circular cross-section smaller than the outer wall cross-section, and the drain tube interface in a substantially circular cross-section between the inner wall cross-section and the outer wall cross-section, and wherein the drain tube interface includes a plurality of drain tubes. In further disclosed methods the plurality of drain tubes substantially surround the inner wall. In still further disclosed methods the plurality of drain tubes are substantially continuous tubes. In still further disclosed methods the plurality of drain tubes are substantially continuous curved tubes.

Other embodiments, advantages, and features also exist.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

Figure 1A:
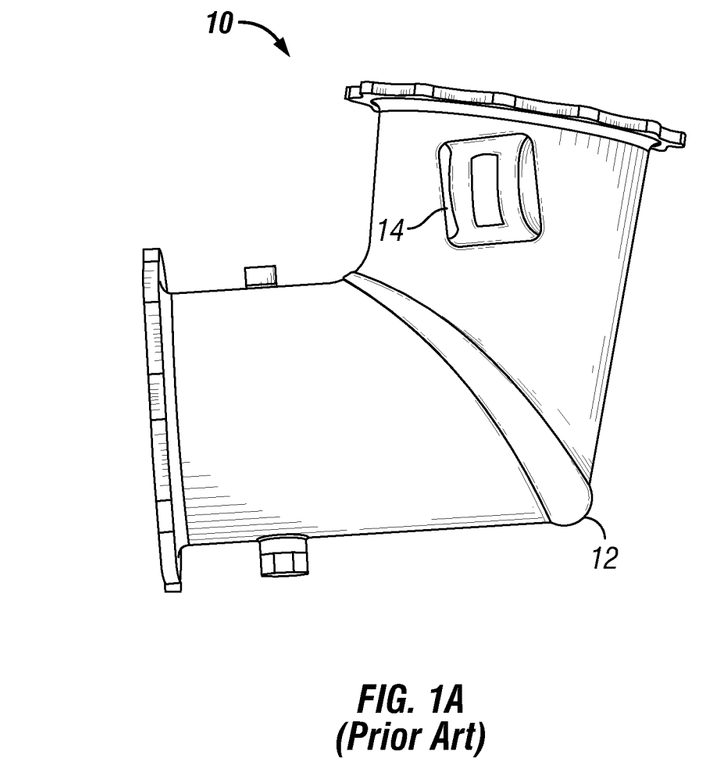
FIGS. 1A and 1B are prior art examples of fluid elbow fittings.
Figure 1B:
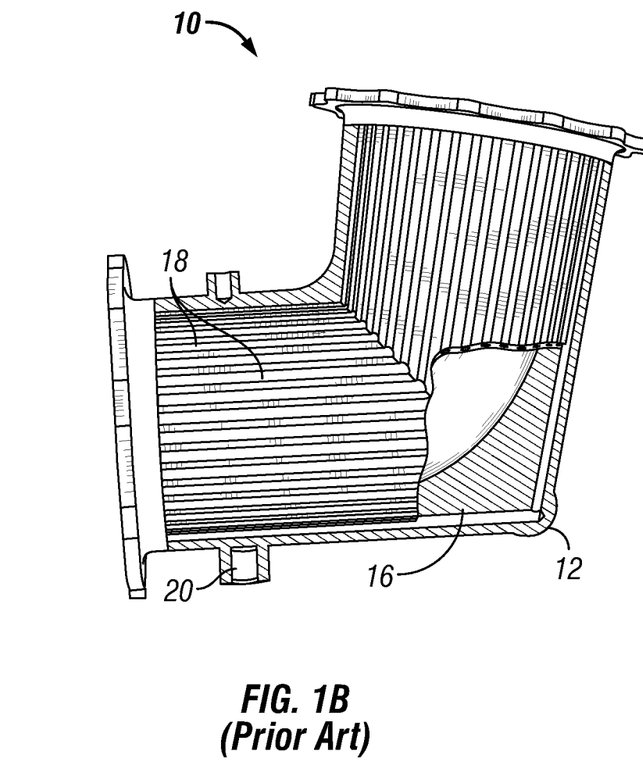

FIGS. 1A and 1B are examples of a prior art fluid fitting, an aircraft fuel delivery elbow fitting 10, that is typically manufactured by fully machining out a large block of aluminum. Full machining (i.e., milling, drilling, and the like) has a waste ratio of approximately 7 to 1. In addition, full machining requires extensive lead times, the cost is high, and there are other production challenges. For example, as shown in FIG. 1A, which is a view of the outside of the elbow fitting 10, the overall shape of the elbow 10 is general a right angle (~90°) bend and certain portions 12 require additional machining for reinforcement and the like. Likewise, attachment lugs 14 require intricate machining or separate manufacturing and welding to the exterior of the elbow fitting 10.

Further, FIG. 1B, which is a view of various portions of the interior of the elbow 10, shows that machining leaves non-functional dead weight material 16 in portions of the part and the time-consuming and intricate machining necessary to make drain tubes 18 match up. Additionally, for a fully machined elbow fitting 10, it is practical to only have one unit, or one count of drain tubes 18 meet up with drain fitting 20. This means that if ice or other obstructions get into that single drain tube 18, it is possible to have a single point failure, such as blockage from ice buildup, for the entire fitting 10 that would not be detected in the sensors associated with drain fitting 20. Other drawbacks, inconveniences, and issues also exist for current fluid fittings and methods of their manufacture.

Figure 2:
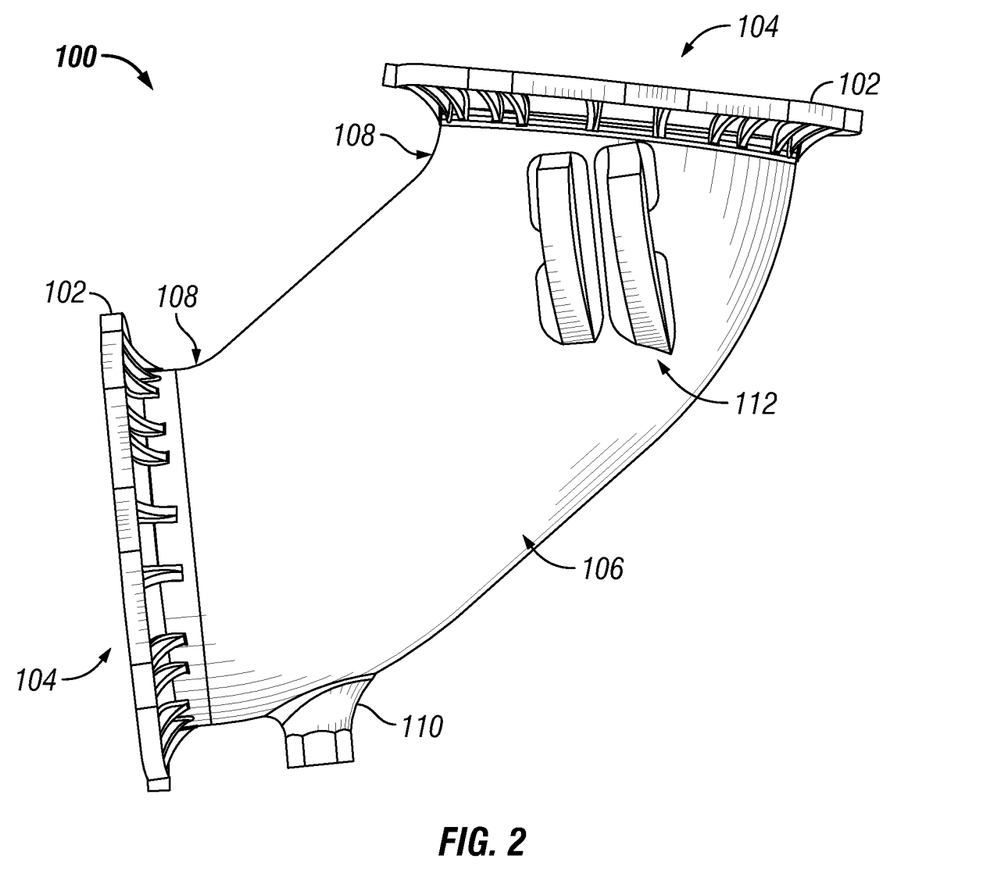
FIG. 2 is a side view of the outside of a fluid fitting in accordance with disclosed embodiments.

FIG. 2 is a side view of the outside of a fluid fitting 100 in accordance with disclosed embodiments. As shown, fluid fitting 100 is sized to replace aircraft fuel delivery elbow fitting 10 and has a flange 102 at each end 104 that connects with other portions of the fuel delivery system. In between each end 104 is a substantially straight portion 106. As also shown, flanges 102 are each angled with a bend 108 with respect to the substantially straight portion 106. The radius of curvature for the bends 108 may be substantially 4 inches for each bend 108 as measured with respect to a central axis, but other radii are also possible. As also shown, embodiments of fluid fitting 100 may have a deflection angle of substantially 144.1° at the lower (left side of FIG. 2) flange 102 and a deflection angle of substantially 137.7° at the upper (right side of FIG. 2) flange 102 as measured with respect to a central axis of the substantially straight portion 106. Other deflection angles are also possible. The geometrical parameters shown in this exemplary embodiment are based on a fully interchangeable system that replaces existing airplane production hardware. The flange 102 interfaces are constrained to current production configuration. The deflection radius of curvature and deflection angles are selected for maximum fuel flow efficiency based on fluid dynamic principles. In principle, larger deflection radii will provide for a lower fluid pressure drop; additionally, a larger deflection angle provides for lower fluid pressure drop. The length of any pipe is also a variable that affects fluid dynamics, shorter pipe lengths provide for lower friction surface and lower pressure drop.

Figure 3:
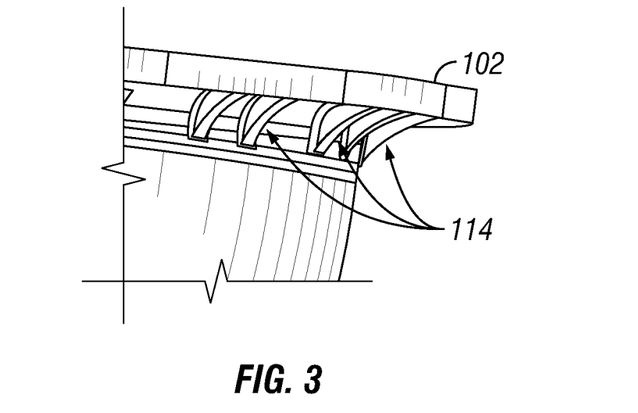
FIG. 3 is a close-up of a portion of a flange in accordance with disclosed embodiments.

As also shown in FIG. 2, embodiments of fluid fitting 100 include a drain connection 110 and attachment lugs 112. As shown in FIG. 3, which is a close-up of a portion of embodiments of upper flange 102, a number of additively manufactured custom curved reinforcement gussets 114 may feather out on the flange edge to strengthen flange 102 and also allow a thinner, lighter flange 102 than compared to prior art elbow fitting 10.

Figure 4:
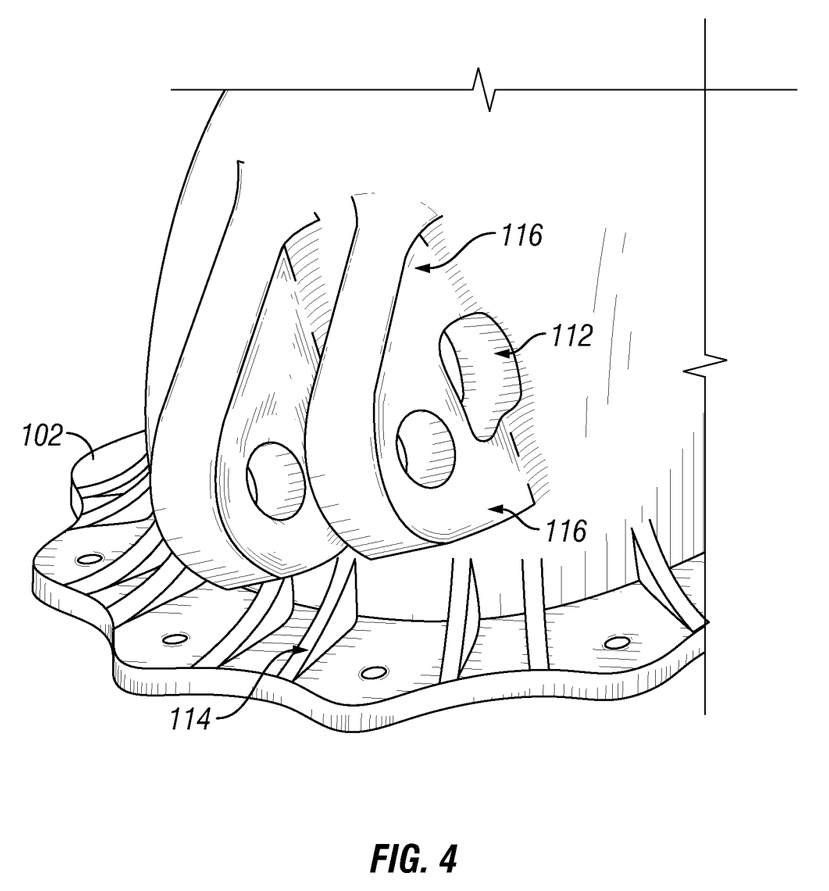
FIG. 4 is a close-up of attachment lugs in accordance with disclosed embodiments.

FIG. 4 is a close-up of attachment lugs 112 in accordance with disclosed embodiments. As shown, embodiments of fluid fitting 100 may include reinforcement structures 116 (e.g., the thicker, angled, curved, or wider portions of the attachment lugs 112 in contact with the fitting 100) that are manufactured through the additive manufacturing techniques disclosed herein and are difficult to duplicate with the prior art machining techniques.

Figure 5:
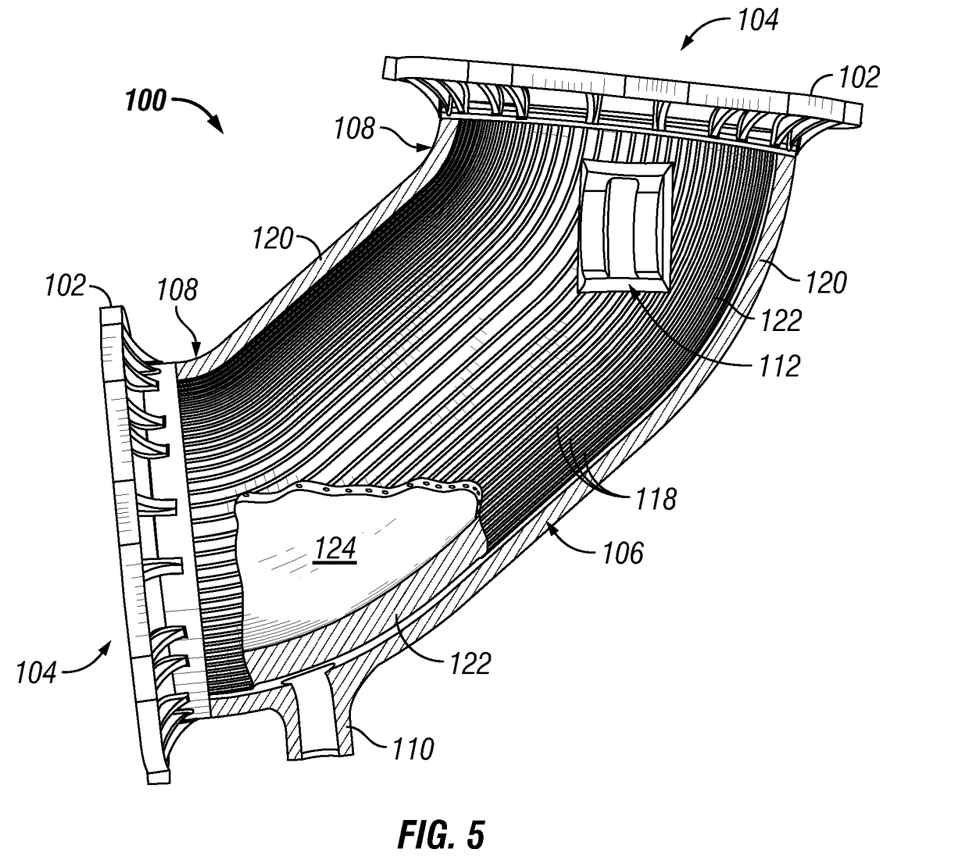
FIG. 5 is a side view of portions of the interior sections of a fluid fitting in accordance with disclosed embodiments.

FIG. 5 is a side view of portions of the interior sections of a fluid fitting 100 in accordance with disclosed embodiments. As shown, embodiments of the fluid fitting 100 include an outer wall 120 spaced apart from an inner wall 122. On the outer surface of the inner wall 122, a number of drain tubes 118 may be formed. Drain tubes 118 may be formed with a diameter of 2 mm to 6 mm (in this example, for the alloy and additive manufacturing machines used, a tube of 2 mm to 6 mm can be printed in any orientation without the need for internal support structure, therefore allowing for variable orientations and internal passages that cannot be produced by conventional machining), or other diameters may be used, and as shown generally follow the contours of the fluid fitting 100.

Figure 6:
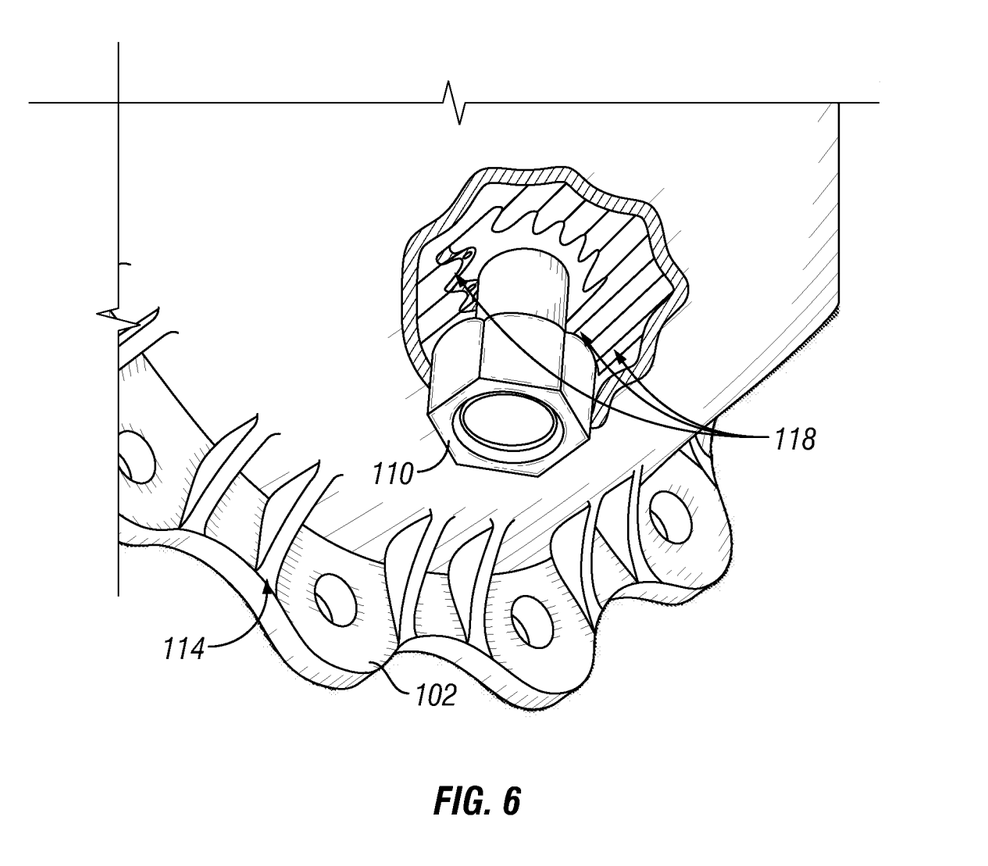
FIG. 6 is a close-up, partially transparent view of a drain in accordance with disclosed embodiments.

FIG. 6 is a close-up, partially transparent view of drain 110 in accordance with disclosed embodiments. As indicated, embodiments of drain 110 can be fabricated with multiple drain tubes 118 in fluid communication with drain 110. This avoids the single point failure issue with prior art elbow fittings 10 that have drilled drain tubes 18 (FIG. 1B).

Figure 7:
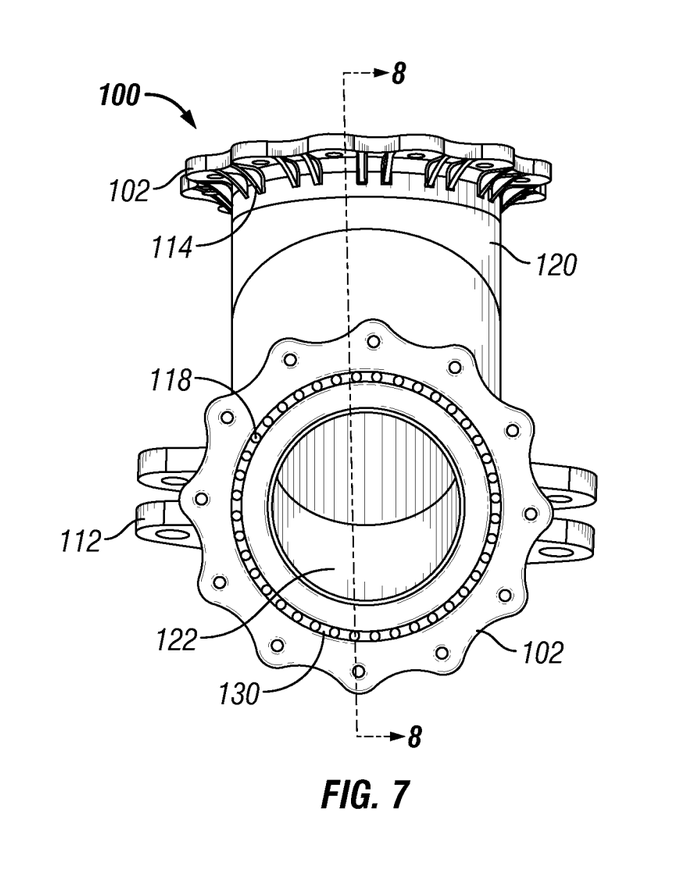
FIG. 7 is an end-on view of a fluid fitting in accordance with disclosed embodiments.
Figure 8:
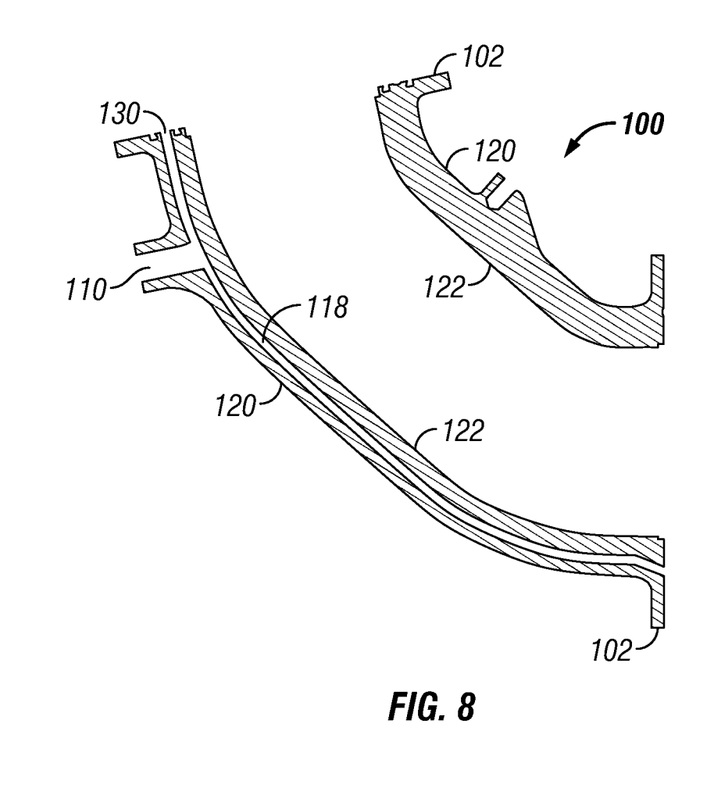
FIG. 8 is a cross-sectional view along line A-A of FIG. 7.

FIG. 7 is an end-on view of the fluid fitting 100 in accordance with disclosed embodiments. As shown, drain tubes 118 may be arranged in a concentric drain tube interface 130 to communicate with other portions of the fluid system (not shown). Such an arrangement provides a redundant wall fitting where, for example, any leaks through inner wall 122 are captured in the drain tubes 118 between inner wall 122 and outer wall 120. As noted herein, the diameter of the drain tubes 118 is chosen such that no internal support structure (e.g., support structure 200) is needed during additive manufacturing. Further, as shown in cross-section in FIG. 8, drain tubes 118 are additively manufactured to be continuous, and more gently curved, than the prior art drain tubes 18 which are typically drilled at right angles (~90°) to intersect in the elbow fitting. In this manner, prior art dead weight material 16 is avoided and the overall weight of the fluid fitting 100 can be reduced (in some embodiments by 30%). Other advantages also exist.

As one of ordinary skill in the art would comprehend having the benefit of this disclosure, the embodiment of fluid fitting 100 shown in FIGS. 2-8, among other things, provides 30% weight reduction over the prior art elbow fitting 10, improves fuel flow efficiency (i.e., lower pressure drop), shortens overall pipe length (less friction surface area), eliminates 90° deflection angle, improves fuel flow deflection radius for higher efficiency, and does not suffer from the single point of failure issues in drain features. Other advantages and features also exist (e.g., reinforced flanges and reinforced lugs).

The herein disclosed fluid fitting 100 is manufactured using 3D "printing" with Selective Laser Melting (SLM) additive manufacturing processes. As persons of ordinary skill in the art having the benefit of this disclosure would understand, SLM generally uses a thin layer of metallic powder deposited on a build plate. Disclosed embodiments of fluid fitting 100 may be made of, but not limited to, powders of aluminum alloys (e.g., $AlSi_{10}Mg$), other alloys, like titanium (e.g., Ti64), steels such as Inconel, or the like. A laser, controlled by a hardware processor in the SLM machine operating under build file instructions, selectively melts the powder, welding it to the build plate. The build plate is lowered, and a new layer of powder is deposited. The laser melts the new layer onto the existing layer. The process is repeated until the desired part is additively "built." Typically, support structures must be included in the build file design process for SLM manufacturing in order to, among other things, provide adequate support for overhanging pieces and the like as they are fabricated layer-by-layer. A balance must be kept between highest performance designs and geometries that can be fabricated by SLM additive manufacturing technology. The parts, and associated build file, must be designed in a way that minimizes the need for support structure to reduce cost and processing time. Build orientation, skin angles, and overhangs must be taken into account in the build file for feasible additive manufacturing designs. Other considerations also exist.

Figure 9:
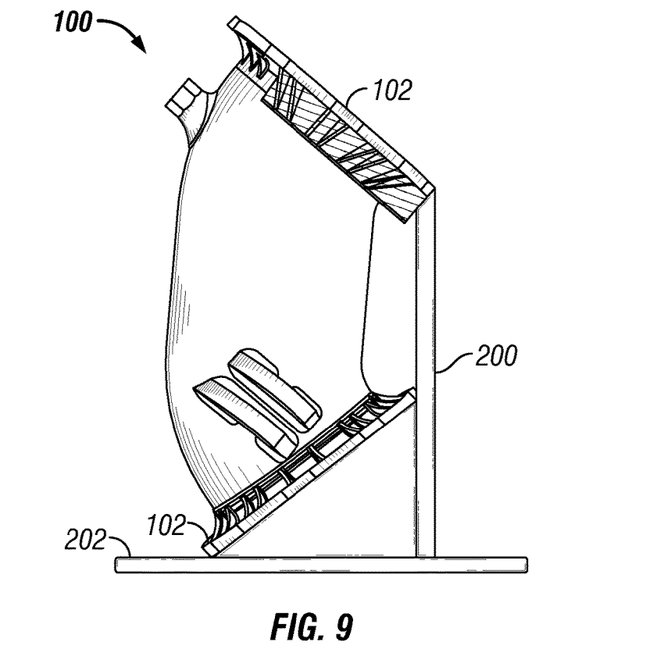
FIG. 9 is a side view of a fluid fitting and support structure on a build plate in accordance with disclosed embodiments.

FIG. 9 is a side view of a fluid fitting 100 and support structure 200 on a build plate 202 in accordance with disclosed embodiments. As discussed herein, support structure 200 needs to be removed after SLM manufacturing and typically includes holes, rims, columns, braces, and the like as exemplarily shown in FIG. 9. This balances the support function during SLM manufacturing with the need to easily remove the support structure 200 later (e.g., by machining or the like).

FIG. 9 also demonstrates a preferred orientation for SLM manufacturing of the disclosed fluid fitting 100. SLM manufacturing in the substantially vertical orientation of the fluid fitting 100, as shown in FIG. 9, among other things, avoids the need for an internal support structure 200 and preserves concentricity of the fitting 100. Additionally, the substantially vertical orientation shown in FIG. 9 allows loose powder (e.g., not melted by the laser) to fall through drain tubes 118 and the interior 124 chamber (both not visible in FIG. 9) as the fitting 100 is built. Likewise, building drain tubes 118, which have small diameters (2-6 mm), allows them to be self-supporting and not require a separate support structure 200 in any orientation within.

Figure 10:
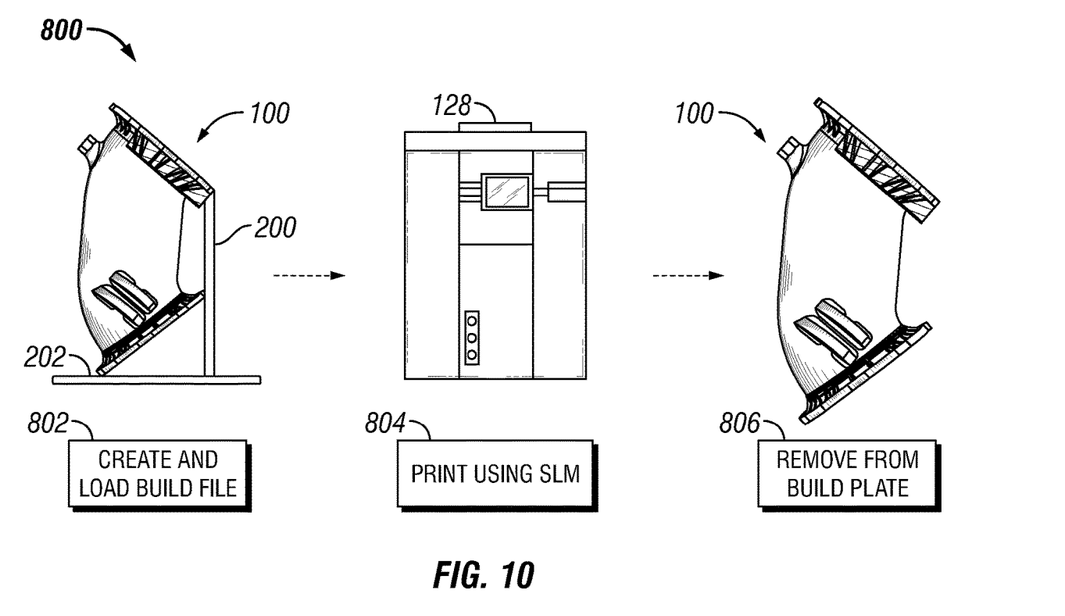
FIG. 10 is a schematic flow chart illustrating methods of manufacturing a fluid fitting in accordance with disclosed embodiments.

FIG. 10 is a schematic flow chart illustrating methods 800 of manufacturing a fluid fitting 100 in accordance with disclosed embodiments. As shown at 802 a build file containing program instructions that cause one or more hardware processors in an SLM additive manufacturing machine 128 to print the fluid fitting 100 and support structure 200 on a build plate 202 is loaded into the SLM additive manufacturing machine 128. At 804 the one or more hardware processors in SLM machine 128 print the fluid fitting 100 and support structure 200 on the build plate 202. As disclosed herein, preferably the fluid fitting 100 is printed in a substantially vertical orientation (e.g., FIG. 7). As indicated at 806, after printing the fluid fitting 100 is removed from the build plate 202.

As persons of ordinary skill in the art having the benefit of this disclosure would understand, other manufacturing steps may also be performed. For example, prior to removal from the build plate 202, excess powder may need to be removed and stress relief performed on the build plate 202 to prevent unintended breaking, warping, or the like, of parts. By way of further example, after removal from the build plate 202 there may occur dimensional inspections and/or CT scans of the parts. By way of still further example, surface smoothing, additional machining, additional inspections, surface finishing, proof testing, and the like may also be performed during manufacturing.

Although various embodiments have been shown and described, the present disclosure is not so limited and will be understood to include all such modifications and variations are would be apparent to one skilled in the art.

What is claimed is:

1. A method for manufacturing a redundant wall fluid deflection fitting, the method comprising:
    loading a build file into a Selective Laser Melting (SLM) additive manufacturing machine, the build file including instructions to cause a hardware processor in the SLM additive manufacturing machine to print the redundant wall fluid deflection fitting on a build plate in accordance with the build file instructions;
    additively printing a first flange comprising:
        an outer wall;
        an inner wall; and
        a drain tube interface between the inner wall and the outer wall and comprising a plurality of drain tubes each having a diameter of substantially 2-6 mm;
    additively printing the outer wall, the inner wall, and the plurality of drain tubes continuously through a first bend to a substantially straight portion to a second bend;
    additively printing a second flange comprising;
        the outer wall;
        the inner wall; and
        the drain tube interface between the inner wall and the outer wall and comprising the plurality of drain tubes and wherein the first flange and the second flange are oriented at an angle substantially defined by the radii of curvature of the first bend and the second bend, and wherein the plurality of drain tubes comprise substantially continuous curved tubes; and removing the redundant wall fluid deflection fitting from the build plate.

2. The method for manufacturing a redundant wall fluid deflection fitting of claim 1 further comprising:

additively printing one or more reinforcement gussets extending between an outer surface of the first flange and the outer wall.

3. The method for manufacturing a redundant wall fluid deflection fitting of claim 1 further comprising:

additively printing a drain in the outer wall and in fluid communication with the plurality of drain tubes.

4. The method for manufacturing a redundant wall fluid deflection fitting of claim 1 wherein the build file instructions further comprise instructions to cause the hardware processor in the SLM additive manufacturing machine to additively print the redundant wall fluid deflection fitting in a substantially vertical orientation from the first flange to the second flange.

5. The method for manufacturing a redundant wall fluid deflection fitting of claim 1 further comprising:

additively printing one or more attachment lugs closer to the first flange than the second flange.

6. The method for manufacturing a redundant wall fluid deflection fitting of claim 5 further comprising:

additively printing one or more reinforcement structures on the attachment lugs.

7. The method for manufacturing a redundant wall fluid deflection fitting of claim 1 wherein the build file instructions further comprise instructions to cause the hardware processor in the SLM additive manufacturing machine to additively print:

the outer wall in a substantially circular cross-section;
the inner wall in a substantially circular cross-section smaller than the outer wall cross-section; and
the drain tube interface in a substantially circular cross-section between the inner wall cross-section and the outer wall cross-section.

8. The method for manufacturing a redundant wall fluid deflection fitting of claim 7 wherein the plurality of drain tubes substantially surround the inner wall.

9. The method for manufacturing a redundant wall fluid deflection fitting of claim 8 wherein the plurality of drain tubes comprise substantially continuous tubes.

10. The method for manufacturing a redundant wall fluid deflection fitting of claim 9 wherein the plurality of drain tubes comprise substantially continuous curved tubes.

11. A redundant wall fluid deflection fitting comprising:
a first flange comprising:
an outer wall;
an inner wall; and
a first drain tube interface between the inner wall and the outer wall and comprising a plurality of drain tubes each having a diameter of substantially 2-6 mm;
a first bend between the first flange and a substantially straight portion and comprising the outer wall, the inner wall, and the plurality of drain tubes;
a second bend between the substantially straight portion and a second flange comprising:
the outer wall;
the inner wall; and
a second drain tube interface between the inner wall and the outer wall and comprising the plurality of drain tubes and wherein the first flange and the second flange are oriented at an angle substantially defined by the radii of curvature of the first bend and the second bend, and wherein the plurality of drain tubes comprise substantially continuous curved tubes.

12. The redundant wall fluid deflection fitting of claim 11 further comprising:

one or more reinforcement gussets extending between an outer surface of the first flange and the outer wall.

13. The redundant wall fluid deflection fitting of claim 11 further comprising:

a drain in the outer wall and in fluid communication with the plurality of drain tubes.

14. The redundant wall fluid deflection fitting of claim 11 further comprising one or more reinforcement gussets extending between an outer surface of the first flange and the outer wall; and one or more reinforcement gussets extending between an outer surface of the second flange and the outer wall.

15. The redundant wall fluid deflection fitting of claim 11 further comprising:

one or more attachment lugs closer to the first flange than the second flange.

16. The redundant wall fluid deflection fitting of claim 15 further comprising:

one or more reinforcement structures on the attachment lugs.

17. The redundant wall fluid deflection fitting of claim 11 wherein the outer wall has a substantially circular cross-section; the inner wall has a substantially circular cross-section smaller than the outer wall cross-section; and the drain tube interface has a substantially circular cross-section between the inner wall cross-section and the outer wall cross-section.

18. The redundant wall fluid deflection fitting of claim 17 wherein the plurality of drain tubes substantially surround the inner wall.

19. The redundant wall fluid deflection fitting of claim 18 wherein the plurality of drain tubes comprise substantially continuous tubes.

20. The redundant wall fluid deflection fitting of claim 19 wherein the plurality of drain tubes comprise substantially continuous curved tubes.

* * * * *